United States Patent
Hama

(10) Patent No.: US 10,768,813 B2
(45) Date of Patent: Sep. 8, 2020

(54) PICTURE-DRAWING DEVICE

(71) Applicant: MegaHouse Corporation, Taito-ku, Tokyo (JP)

(72) Inventor: Takaaki Hama, Tokyo (JP)

(73) Assignee: MegaHouse Corporation, Tokyo (JP)

(*) Notice: Subject to any disclaimer, the term of this patent is extended or adjusted under 35 U.S.C. 154(b) by 0 days.

(21) Appl. No.: 16/309,032

(22) PCT Filed: Jun. 13, 2017

(86) PCT No.: PCT/JP2017/021853
§ 371 (c)(1),
(2) Date: Dec. 11, 2018

(87) PCT Pub. No.: WO2017/217421
PCT Pub. Date: Dec. 21, 2017

(65) Prior Publication Data
US 2019/0250816 A1    Aug. 15, 2019

(30) Foreign Application Priority Data
Jun. 14, 2016 (JP) .................................. 2016-117921

(51) Int. Cl.
*G06F 3/0488* (2013.01)
*A63H 33/26* (2006.01)
(Continued)

(52) U.S. Cl.
CPC ......... *G06F 3/04886* (2013.01); *A63H 33/00* (2013.01); *A63H 33/26* (2013.01);
(Continued)

(58) Field of Classification Search
CPC .. G06F 3/04886; G06F 3/041; G06F 3/04883; G06F 3/0414; G06F 2200/1632; G06F 3/03548
See application file for complete search history.

(56) References Cited

U.S. PATENT DOCUMENTS 5,401,916 A * 3/1995 Crooks .................... G06F 3/033
178/18.03
2002/0113779 A1* 8/2002 Itoh ........................ G06F 3/0414
345/173
(Continued)

FOREIGN PATENT DOCUMENTS

JP     3047170 U       3/1998
JP     2002-229724 A   8/2002
JP     2003-196024 A   7/2003

OTHER PUBLICATIONS

E ga Ugoku!? Hozon mo Toko o Dekiru!? Takara Tomy no "Sensei" Apuri Ban) tte Ima Koko made Shinka shite Iruno!? [online], Mar. 15, 2012 http://www.tabroid.jp/app/books/2012/03/jp.nas.Sesei.html.

*Primary Examiner* — Md Saiful A Siddiqui
(74) *Attorney, Agent, or Firm* — Schroeder Law PC

(57) ABSTRACT

A drawing device according to the present disclosure includes a device body that includes a drawing screen of a liquid crystal screen, a pressure sensor provided on the drawing screen and configured to detect pressure on the drawing screen, an eraser bar provided in the device body and configured to slide along the drawing screen, an eraser bar position detection port as an eraser bar position sensor configured to detect a position of the eraser bar, and a control unit configured to perform a drawing process in which a picture is drawn on the drawing screen along a position where the pressure on the drawing screen is detected. The control unit is configured to erase the picture on the drawing screen in accordance with a moving range of the eraser bar when the eraser bar is moved.

4 Claims, 8 Drawing Sheets

(51) Int. Cl.
    *G06F 3/041*     (2006.01)
    *A63H 33/00*     (2006.01)
(52) U.S. Cl.
    CPC ............ *G06F 3/041* (2013.01); *G06F 3/0414* (2013.01); *G06F 3/04883* (2013.01)

(56)         References Cited

U.S. PATENT DOCUMENTS

2005/0106538 A1* 5/2005 Freeman .................. G09B 5/02
                                                  434/167
2008/0193909 A1   8/2008 Marshall
2014/0123042 A1* 5/2014 Lee ..................... G06F 3/04883
                                                  715/765

* cited by examiner

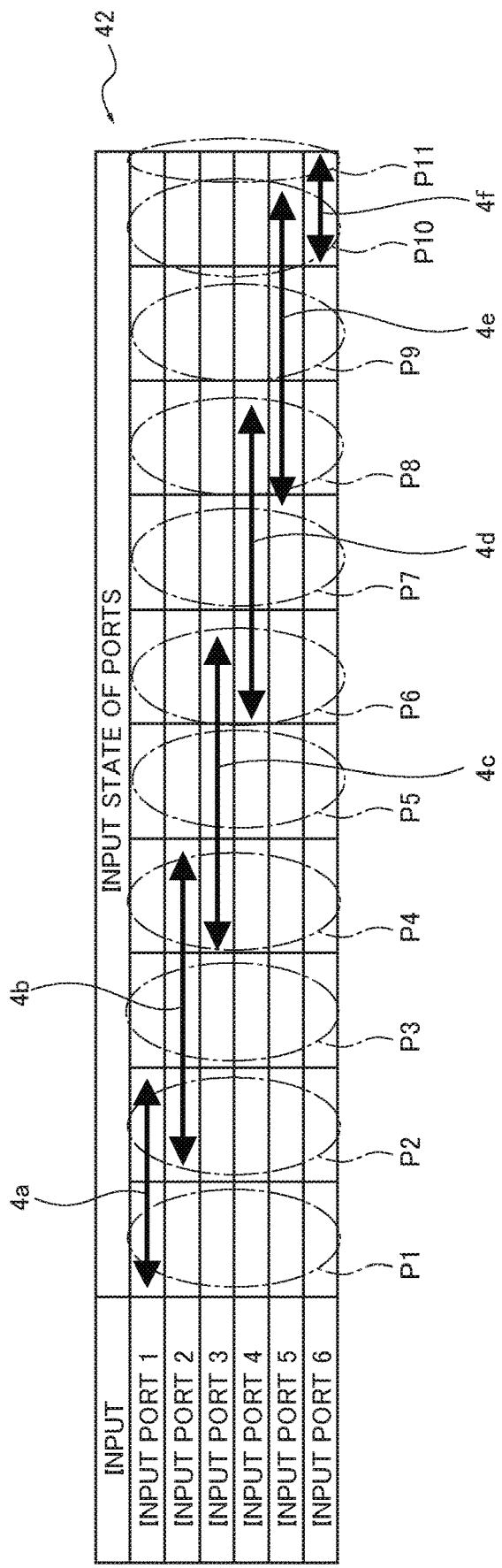

FIG.4B

| INPUT \ STATE | P1 | P2 | P3 | P4 | P5 | P6 | P7 | P8 | P9 | P10 | P11 |
|---|---|---|---|---|---|---|---|---|---|---|---|
| INPUT PORT 1 | 1 | 1 | 0 | 0 | 0 | 0 | 0 | 0 | 0 | 0 | 0 |
| INPUT PORT 2 | 0 | 1 | 1 | 1 | 0 | 0 | 0 | 0 | 0 | 0 | 0 |
| INPUT PORT 3 | 0 | 0 | 0 | 1 | 1 | 1 | 1 | 0 | 0 | 0 | 0 |
| INPUT PORT 4 | 0 | 0 | 0 | 0 | 0 | 1 | 0 | 1 | 1 | 1 | 0 |
| INPUT PORT 5 | 0 | 0 | 0 | 0 | 0 | 0 | 0 | 1 | 0 | 1 | 1 |
| INPUT PORT 6 | 0 | 0 | 0 | 0 | 0 | 0 | 0 | 0 | 0 | 0 | 1 |
| LIQUID CRYSTAL (dots) | UNCHANGED | 80dots ERASED | 160dots ERASED | 240dots ERASED | 320dots ERASED | 400dots ERASED | 480dots ERASED | 560dots ERASED | 640dots ERASED | 720dots ERASED | 800dots ERASED |

1:INPUT
0:NO INPUT

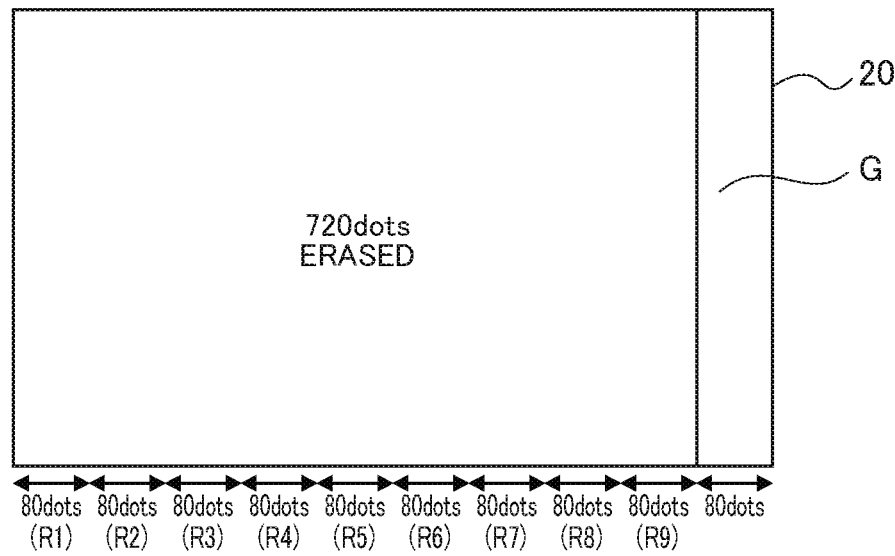
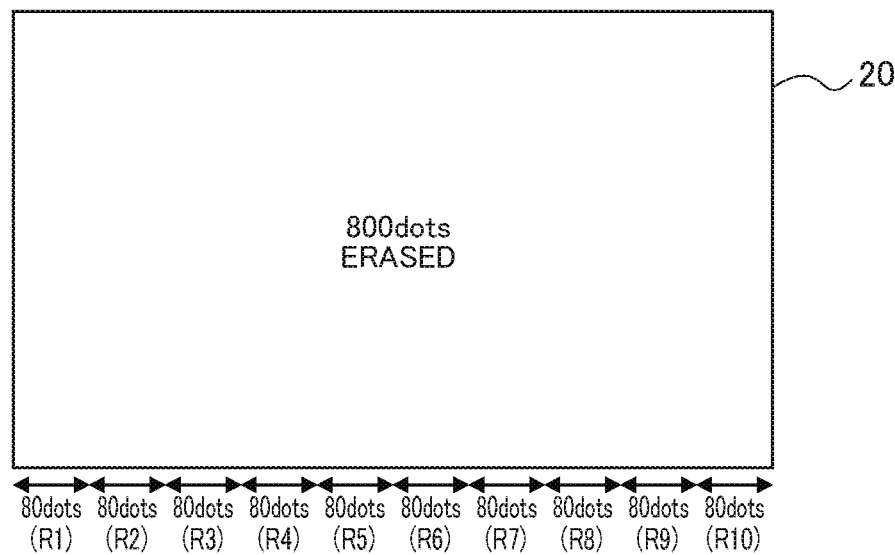

PICTURE-DRAWING DEVICE

CROSS-REFERENCE TO RELATED APPLICATION

The present application is based on and claims priority from Japanese Patent Application No. 2016-117921, filed on Jun. 14, 2016, the disclosure of which is hereby incorporated by reference in its entirety.

TECHNICAL FIELD

The present disclosure relates to a drawing device.

BACKGROUND ART

Conventionally, a drawing board or device is known in the art in which pictures are drawn on a drawing board or screen with a pen and erasable so that pictures can be repeatedly drawn. A magnetic drawing device is the most known device among such drawing devices. The magnetic drawing device includes a white drawing screen, magnetic powders provided under the drawing screen and a magnetic pen. The magnetic powders are attracted when the magnetic pen is moved on the drawing screen. As a result, a colored (e.g. black) line is drawn along the trajectory of the magnetic pen on the drawing screen. The conventional drawing device also includes an eraser bar on the bottom side, or the right or left side thereof. When erasing lines on the drawing screen in the conventional drawing device, an erase operation is performed in which the eraser bar is slid along the drawing screen to erase the lines. As a result, a magnetic bar of the eraser bar provided under the drawing screen moves along the drawing screen and drops off the magnetic powders attached to the drawing screen so that pictures and/or letters on the drawing screen are erased.

Recently, a drawing device including a liquid crystal screen is known in the art (see Patent Literature 1: JP 2003-196024 A, for example). In this prior art, when the liquid crystal drawing screen is directly touched by a pen or a finger, piezoelectric elements detect touched positions so that a picture can be drawn along the trajectory of the detected positions. Also, when erasing the picture on the drawing screen in this prior art, an eraser mode is selected and then a part of the picture to be erased is traced by the pen and the like. Alternatively, a delete button is pushed to erase the entire picture at once. Accordingly, pictures can also be repeatedly drawn on the liquid crystal drawing screen in this prior art. Also, more colors can be freely selected and deterioration can be reduced compared to the most commonly used magnetic drawing device.

SUMMARY

Although the prior art disclosed in Patent Literature 1 has a good drawing function, it requires the erase operation such as pushing the delete button which is provided on or outside the screen, or tracing the picture as the eraser mode. The erase operations for such liquid crystal drawing screens have not been standardized yet. Although it is usual to draw pictures by a touch pen or stylus, it is not easy to erase the pictures when using the drawing device disclosed in Patent Literature 1 for the first time due to an intuitive operation or an erase operation based on the conventionally common recognition users have had for a long time. In particular, younger children may not understand the erase operation by being explained only once.

The present disclosure is made in view of the above issues. An object of the present disclosure is to provide a drawing device which allows the erase operation based on the common recognition and the intuitive operation even when users use the drawing device for the first time.

A drawing device of the present disclosure includes
a device body that comprises a drawing screen of a liquid crystal screen,
a pressure sensor provided on the drawing screen and configured to detect pressure applied to the drawing screen,
an eraser bar provided in the device body and configured to slide along the drawing screen,
an eraser bar position sensor configured to detect a position of the eraser bar, and
a control unit configured to perform a drawing process in which a picture is drawn on the drawing screen along a position where the pressure on the drawing screen is detected,
wherein the control unit is configured to erase the picture on the drawing screen in accordance with a moving range of the eraser bar when the eraser bar is moved.

BRIEF DESCRIPTION OF DRAWINGS

FIG. 4A is a drawing which shows a positional relation between an eraser bar position detection port of the drawing device and areas to be erased on the drawing screen in the first embodiment, and a positional relation between the eraser bar position detection port and the drawing screen.

FIG. 4B is a plain view which shows the positional relation between the eraser bar position detection port of the drawing device and the areas to be erased in the first embodiment, and the input of the eraser bar position detection port in accordance with the position of an eraser bar.

FIG. 5J is a plain view showing the drawing screen with an area R9 being erased further from the state shown in FIG. 5I. FIG. 5K is a plain view showing the drawing screen with an area R10 being erased further from the state shown in FIG. 5J so that all of the areas are erased.

DESCRIPTION OF EMBODIMENTS (First Embodiment) Hereinafter, an embodiment of the present disclosure will be described with reference to the accompanying drawings.

Figure 1:
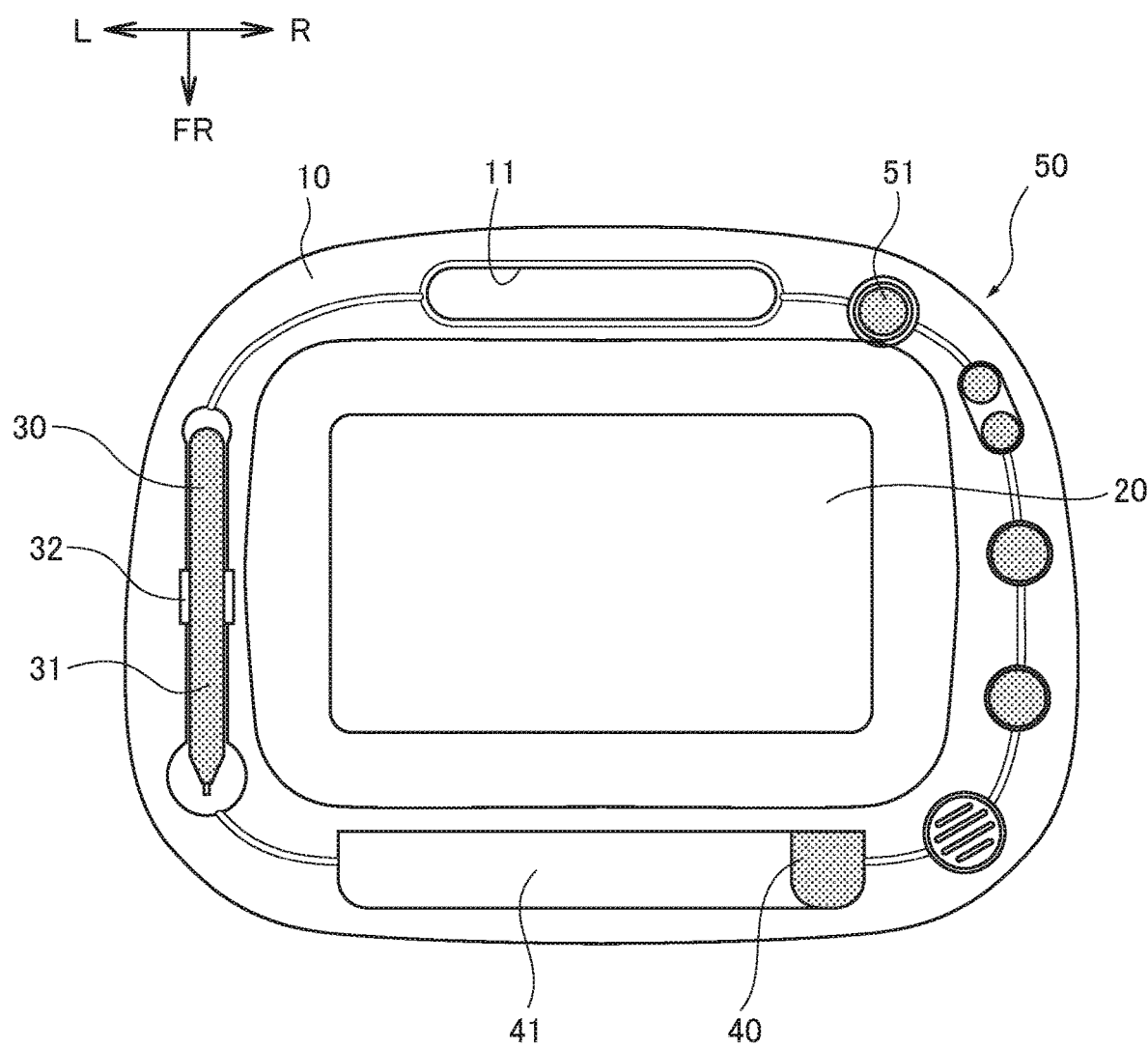
FIG. 1 is a plain view showing a drawing device according to the first embodiment of the present disclosure.

First, the configuration of a drawing device according to the first embodiment will be described. FIG. 1 is a plan view showing the drawing device according to the first embodiment. The drawing device includes a device body 10, a drawing screen 20, a touch pen or stylus 30, an eraser bar 40 and a group of sensors (a sensor group) 50.

The device body 10 includes the drawing screen 20 in the center thereof, which is substantially rectangular. As shown in the figure, the eraser bar 40 is disposed on a lower side and a front side (the side shown with an arrow FR) of the drawing screen 20. The device body 10 is integrally formed with a carry handle 11 on the upper side of the drawing screen 20.

As shown in the drawing, the drawing screen 20 has a substantially rectangular shape elongated in a horizontal direction. The drawing screen 20 consists of a liquid crystal display module (see FIG. 2). Note that the drawing screen 20 is generally placed such that the lower side of the screen 20 faces a user when used. Hereinafter, in FIG. 1, a direction shown by the arrow FR is also referred to as a front direction (the user side), a direction shown by an arrow L is also referred to as a left direction, and a direction shown by an arrow R is s also referred to as a right direction.

The eraser bar 40 is slidable in a left-right direction along a slide groove 41. The slide groove 41 is formed along the drawing screen 20.

Further, the device body 10 includes a holder slot 31 provided on the left side of the drawing screen 20 to hold the stylus 30. The holder slot 31 includes engaging claws 32 provided in the middle thereof. The engaging claws 32 are formed to hold the stylus 30 in the holder slot 31 when engaging with the stylus 30.

In addition, the device body 10 includes the sensor group 50 on an upper right side thereof. The sensor group 50 includes a plurality of switches. The sensor group 50 includes an ON/OFF switch 51 which switches between an active state (ON-state) which allows drawing on the drawing screen 20 and an inactive state (OFF-state) which does not allow drawing on the drawing screen 20.

Figure 2:
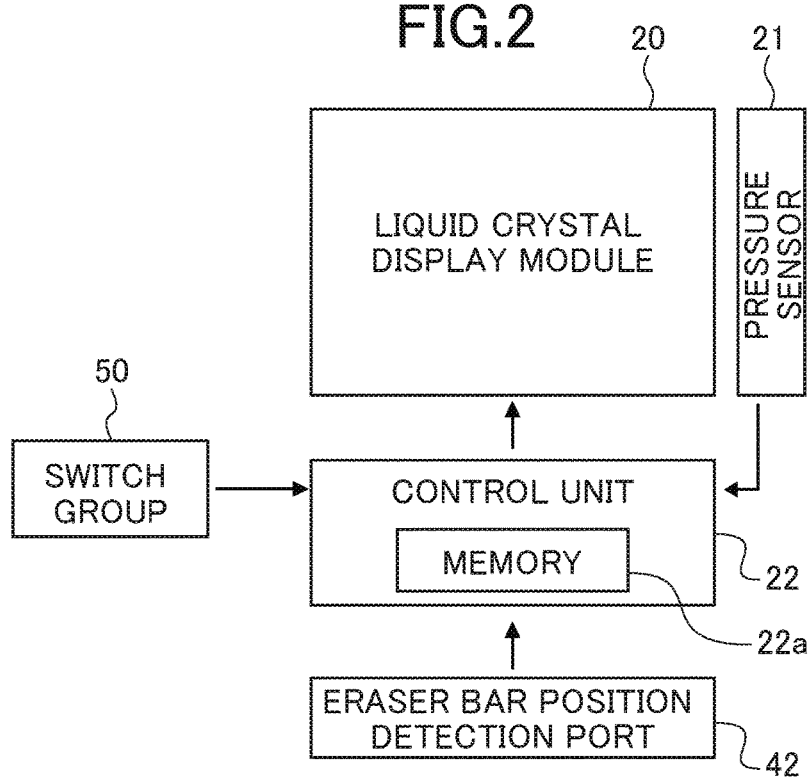
FIG. 2 is a block diagram showing a control system of the drawing device according to the first embodiment.

Now, the control system of the drawing device according to the first embodiment will be described. FIG. 2 is a block diagram showing the control system of the drawing device according to the first embodiment. A pressure sensor 21 is provided on the drawing screen 20 to detect pressure applied to the drawing screen 20.

The display on the drawing screen 20 is controlled by a control unit 22. The control unit 22 is configured to read signals from the pressure sensor 21, the sensor group 50 and an eraser bar position detection port 42 which will be described below to perform a drawing process in which a picture is drawn on the drawing screen 20 and an erasing process in which the picture is erased.

As the control of drawing by the control unit 22, a process is performed to draw a line along positions where the pressure sensor 21 detects pressure at least during a drawing mode is set. At that time, the font of the line such as colors and sizes can be set in accordance with the setting operation of various setting portions which are included in the sensor group 50. Further, the picture on the drawing screen 20 in the drawing mode is stored in a memory 22a so that the pictured state is maintained.

In the erasing process by the control unit 22, the picture on the drawing screen 20 is erased in accordance with the slide of the eraser bar 40 which is the most common erase operation in the drawing device.

Figure 3:
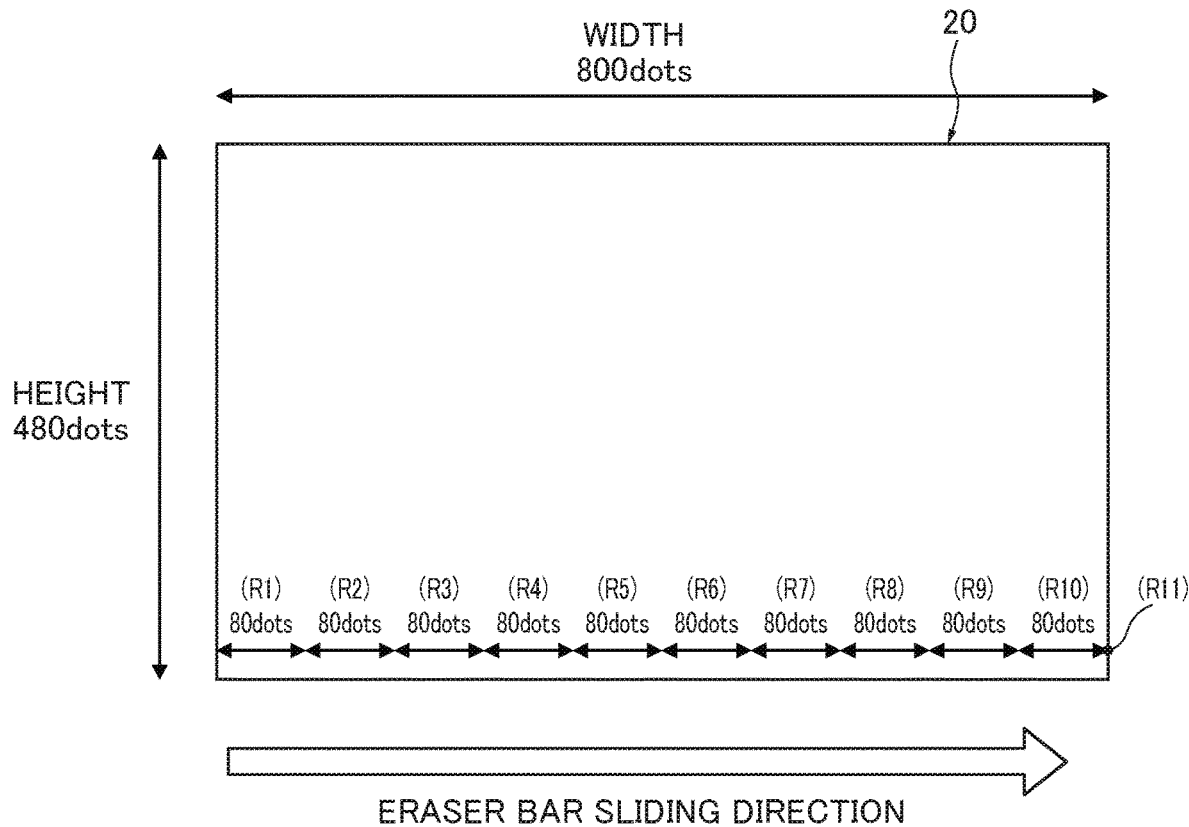
FIG. 3 is a drawing which shows the size of the drawing device, pixel units and areas to be erased according to the first embodiment.

Hereinafter, the control process by the control unit 22 will be described in detail. In the erase operation of the picture displayed on the drawing screen 20, the eraser bar 40 is moved from the left end to the right end relative to the drawing screen 20 as shown with an arrow in FIG. 3. With this operation, the drawing screen 20 is erased by each area R1 to R10 in the entire height (480 dots) of the area. Each area has a predetermined pixel unit (80 dots in this embodiment) in a width direction. In this embodiment, as shown in FIG. 3, the drawing screen with 800 dots in width and 480 dots in height is used as the drawing screen 20. However, the number of dots in the drawing screen 20 is not limited to the above. Similarly, in the erasing process, the pixel units of the areas R1 to R10 to be erased and the number of the areas R1 to R10 are not limited to 80 dots.

The detection of the position of the eraser bar 40 in the erase operation is made based on input signals to the eraser bar position detection port 42. The eraser bar position detection port 42 is provided on the back side of the slide groove 41, for example. As shown in FIG. 4A, six input ports 1 to 6 are arranged in a direction perpendicular to the moving direction (left and right direction) of the eraser bar 40. Port terminal portions 4a to 4F of the input ports 1 to 6 contact terminal portions (not shown) of the eraser bar 40. The port terminal portions 4a to 4F are arranged to correspond to the areas R1 to R10 each having predetermined pixel numbers in the drawing screen 20 so that each of the port terminal portions 4a to 4F is arranged different from each other in a left and right direction. Note that an area R11 shown in FIG. 3 is an area at the right end of the area R10 which is located at the right end of the drawing screen 20, and the area R11 is located at a position where the eraser bar 40 is placed when the eraser bar 40 is moved to the right end of the slide groove 41 (the drawing screen 20).

The contact state between the terminal portions of the eraser bar 40 and the port terminal portions 4a to 4f, that is, an input to each of the input ports 1 to 6 is as shown in FIG. 4B. In other words, at a position where the eraser bar 40 overlaps an area R1 located at the left end of the slide groove 41 (the drawing screen 20), only the port terminal portion 4a is in the contact state and only the input port 1 receives an input (i.e. "1"). This state is defined as a state P1 of the eraser bar position detection port 42. At a position where the eraser bar 40 overlaps an area R2 which is located adjacent to the right end of the area R1 in the drawing screen 20, the port terminal portions 4a, 4b are in the contact state and the input ports 1, 2 receive the input (i.e. "1"). This state is defined as a state P2 of the eraser bar position detection port 42. At a position where the eraser bar 40 overlaps an area R3 which is located adjacent to the right end of the area R2 in the drawing screen 20, only the port terminal portion 4b is in the contact state, and only the input port 2 receives an input (i.e. "1"). This state is defined as a state P3 of the eraser bar position detection port 42. At a position where the eraser bar 40 overlaps an area R4 which is located adjacent to the right end of the area R3 in the drawing screen 20, the port terminal portions 4b, 4c are in the contact state, and the input ports 2, 3 receive an input (i.e. "1"). At a position where the eraser bar 40 overlaps an area R5 which is located adjacent to the right end of the area R4 in the drawing screen 20, only the port terminal portion 4c is in the contact state, and only the input port 3 receives the input (i.e. "1"). This state is defined as a state P5 of the eraser bar position detection port 42. At a position where the eraser bar 40 overlaps an area R6 which is located adjacent to the right end of the area R5 in the drawing screen 20, the port terminal portions 4c, 4d are in the contact state, and the input ports 3, 4 receive the input (i.e. "1"). This state is defined as a state P6 of the eraser bar position detection port 42. At a position where the eraser bar 40 overlaps an area R7 which is located adjacent to the right end of the area R6, only the port terminal portion 4d is in the contact state, and the input port 4 receives the input (i.e. "1"). This state is defined as a state P7 of the eraser bar position detection port 42. At a position where the eraser bar 40 overlaps an area R8 which is located adjacent to the right end of the area R7 in the drawing screen 20, the port terminal portions 4d, 4e are in the contact state, and the input ports 4, 5 receive the input (i.e. "1"). This state is defined as a state P8 of the eraser bar position detection port 42. At a position where the eraser bar 40 overlaps an area R9 which is located adjacent to the right end of the area R8 in the drawing screen 20, only the port terminal portion 4e is in the contact state, and only the input port 5 receives the input (i.e. "1"). This state is defined as a state P9 of the eraser bar position detection port 42. At a position where the eraser bar 40 overlaps an area R10 which is located adjacent to the right end of the area R9 in the drawing screen 20, the port terminal portions 4e, 4f are in the contact state, and the input ports 5, 6 receive the input (i.e. "1"). This state is defined as a state P10 of the eraser bar position detection port 42. At an area R11 in the right end of the area R10 in the drawing screen 20 and the right end of the slide groove 41, only the port terminal portion 4f is in the contact state, and only the input port 6 receives the input (i.e. "1"). This state is defined as a state P11 of the eraser bar position detection port 42. It is detected which areas R1 to R11 defined by horizontally dividing the drawing screen 20 the eraser bar 40 overlaps based on the presence or absence (states P1 to P11) of the input to the input ports 1 to 6 of the eraser bar position detection port 42.

Figure 5A:
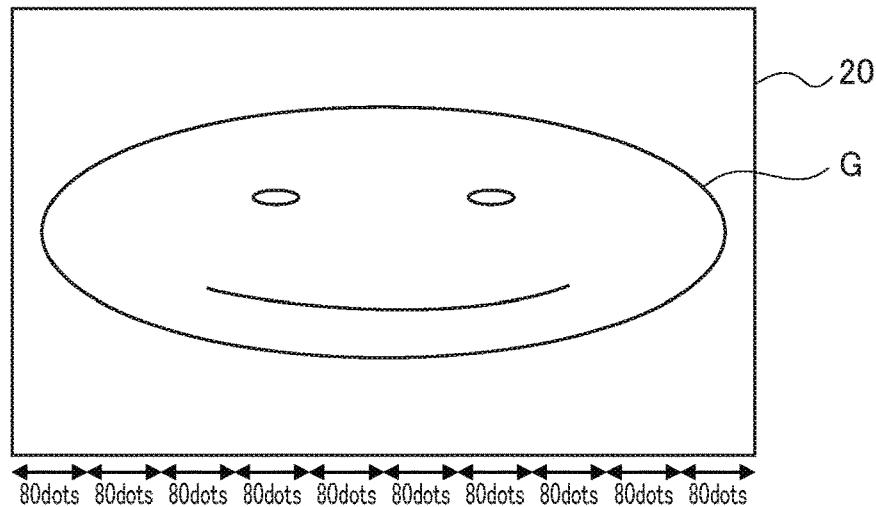
FIG. 5A is a plain view showing the drawing screen of the drawing device in a drawing mode according to the first embodiment.

Now, the control process including the erasing process will be described. The control process includes the erasing process by the control unit 22 which is performed based on the position of the eraser bar 40. As described above, in the state P1 in which the eraser bar 40 is moved to the left end of the slide groove 41 and overlaps the area R1, the control unit 22 sets the device as the drawing mode. In the drawing mode, as shown in FIG. 5A, drawing can be allowed in all areas of the drawing screen 20. Further, the pictured state on the drawing screen 20 is maintained.

Figure 5B:
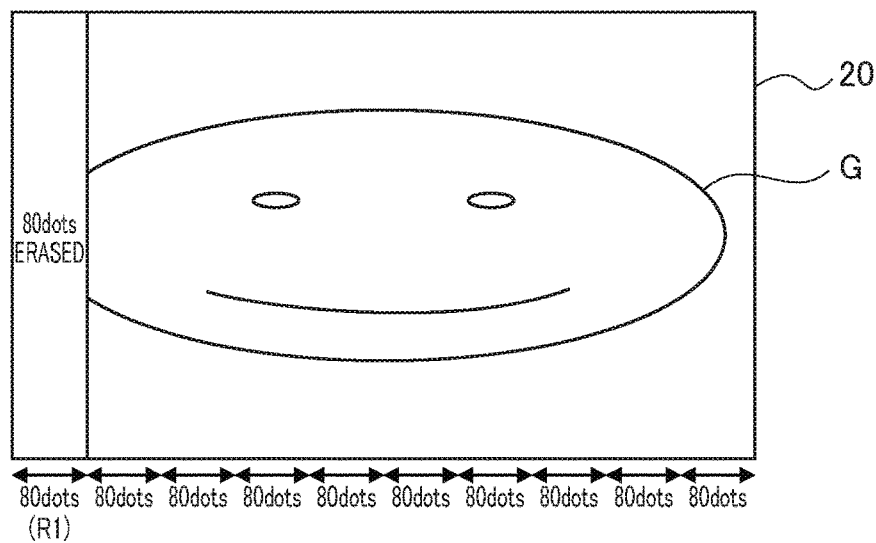
FIG. 5B is a plain view showing the drawing screen of the drawing device according to the first embodiment with an area R1 being erased, which is located at the left end of the drawing screen.

When the picture on the drawing screen 20 is to be erased from the drawing mode shown in FIG. 5A, the eraser bar 40 is slid from the left end (one end) of the slide groove 41 to the right end (the other end) as described above. When the eraser bar 40 is moved from the position overlapping the area R1 to the position overlapping the area R2 and the eraser bar position detection port 42 is in the state P2, the control unit 22 erases the picture and the background in the area R1 at the left end of the drawing screen 20 as shown in FIG. 5B. At this time, when the eraser bar 40 is returned to the area R1 to be in the state P1, the control unit 22 redisplays the erased picture in the area R1 and sets the device to the drawing mode since the picture in the area R1 is stored in the memory 22a.

Figure 5C:
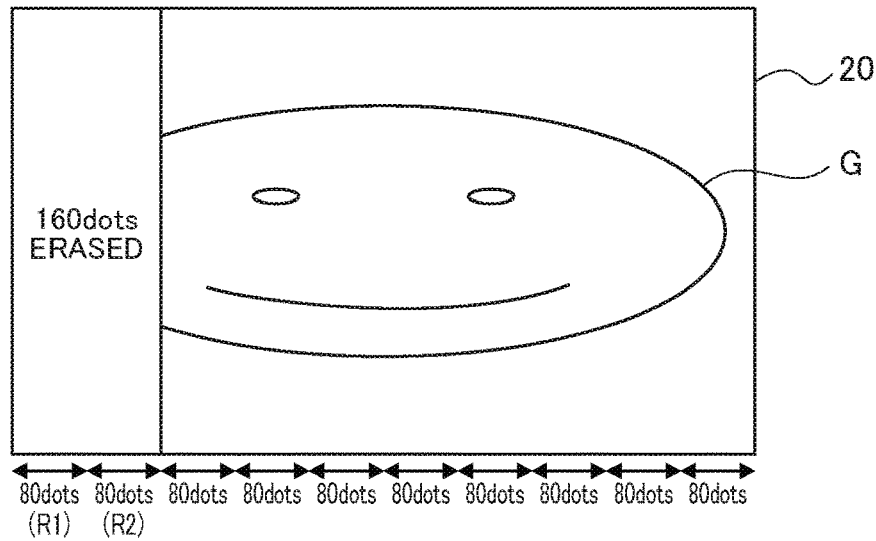
FIG. 5C is a plain view showing the drawing screen with an area R2 being erased further from the state shown in FIG. 5B.

Then, when the eraser bar 40 is moved from the position overlapping the area R2 to the position overlapping the area R3 and the eraser bar position detection port 42 is in the state P3, the control unit 22 erases the picture and the background in the areas (160 dots) including the areas R1, R2 of the drawing screen 20 as shown in FIG. 5C. At this time, the erased picture is stored in the memory 22a. Accordingly, the control unit 22 redisplays the erased picture when the eraser bar 40 is returned to the position overlapping the areas R2, R1, or the control unit 22 sets the device to the drawing mode when the eraser bar 40 is returned to the area R1.

Figure 5D:
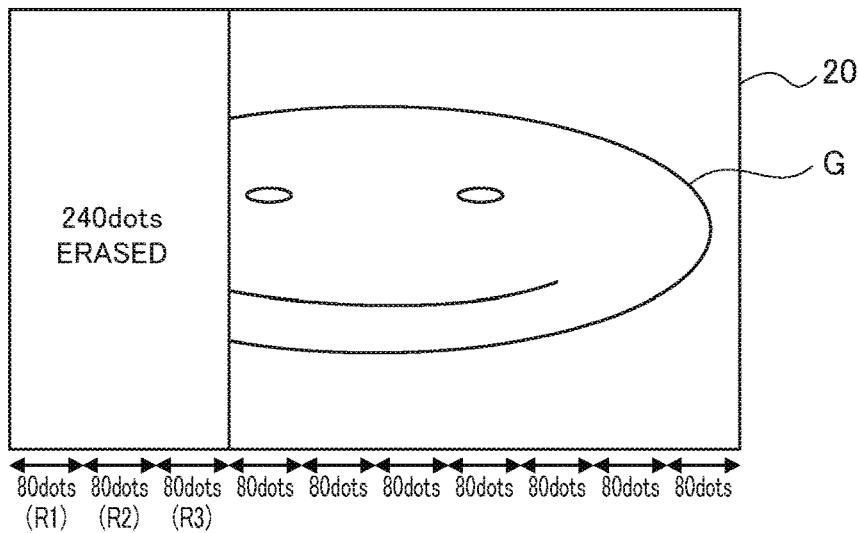
FIG. 5D is a plain view showing the drawing screen with an area R3 being erased further from the state shown in FIG. 5C.
Figure 5E:
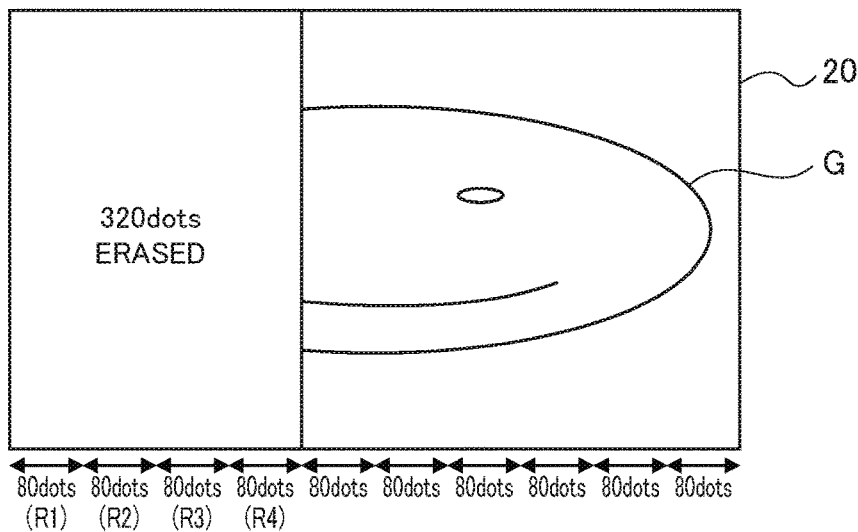
FIG. 5E is a plain view showing the drawing screen with an area R4 being erased further from the state shown in FIG. 5D.
Figure 5F:
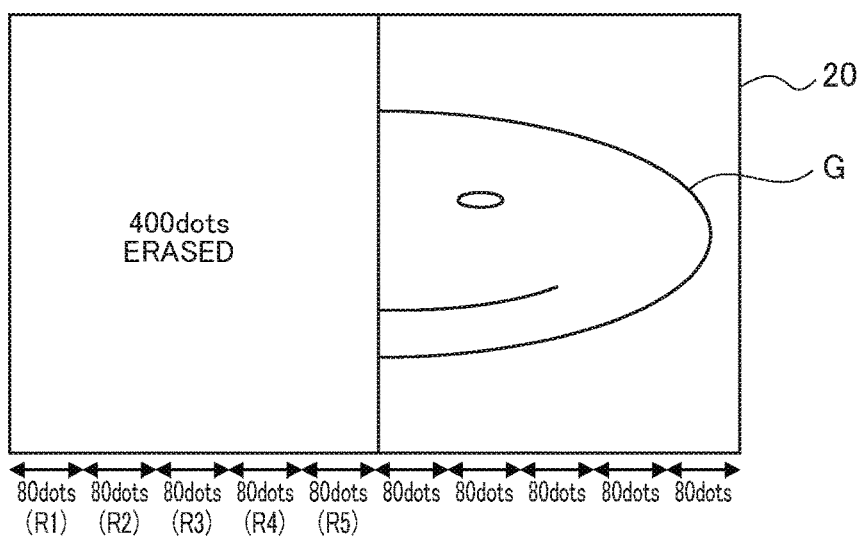
FIG. 5F is a plain view showing the drawing screen with an area R5 being erased further from the state shown in FIG. 5E.
Figure 5G:
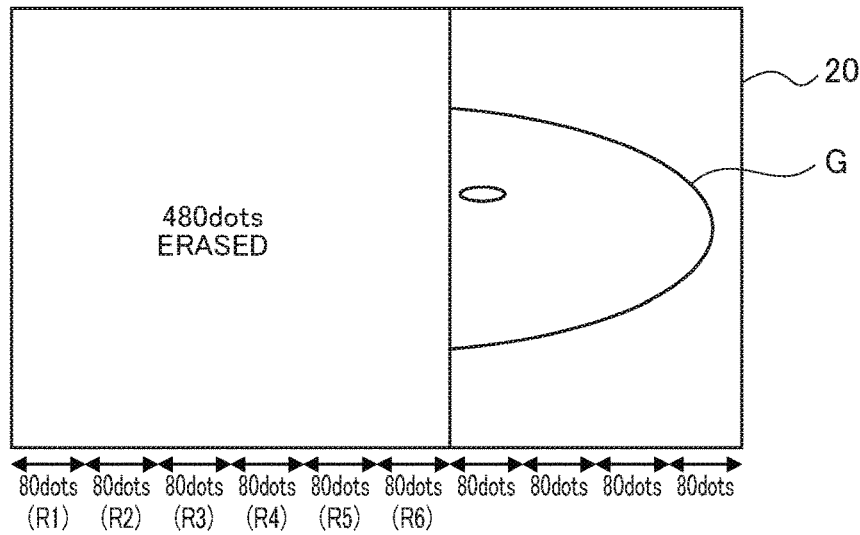
FIG. 5G is a plain view showing the drawing screen with an area R6 being erased further from the state shown in FIG. 5F.
Figure 5H:
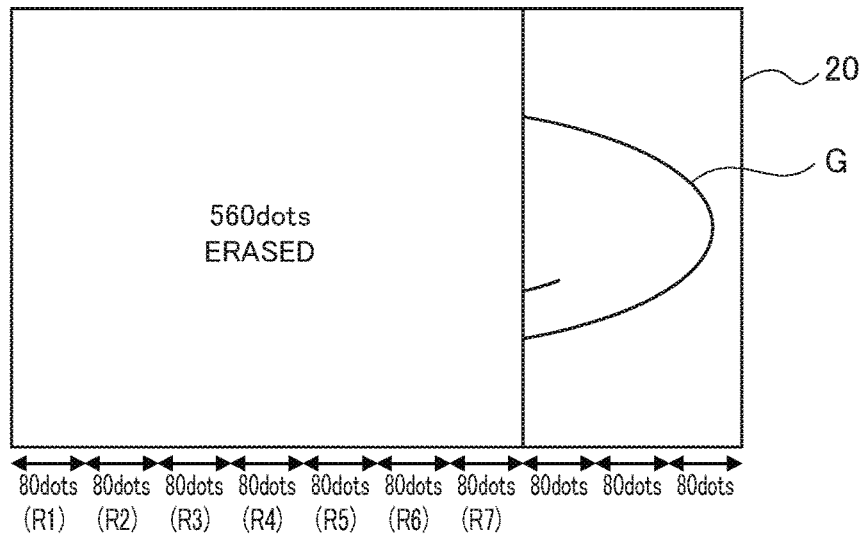
FIG. 5H is a plain view showing the drawing screen with an area R7 being erased further from the state shown in FIG. 5G.
Figure 5I:
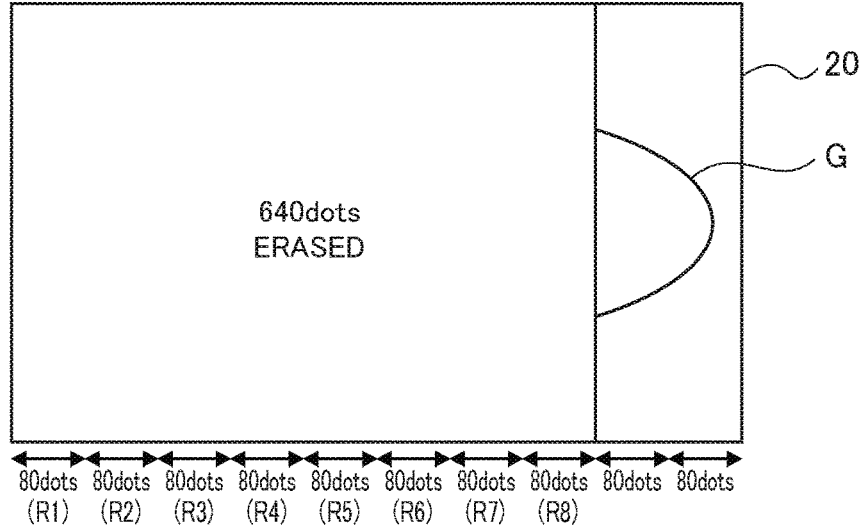
FIG. 5I is a plain view showing the drawing screen with an area R8 being erased further from the state shown in FIG. 5H.

Similarly, in the state P4 of the eraser bar position detection port 42 where the eraser bar 40 is moved to the position overlapping the area R4, the control unit 22 erases the picture and the background in the areas R1 to R3 (240 dots) of the drawing screen 20 as shown in FIG. 5D. Also, the same operation is performed when the eraser bar 40 is returned to the left end as described above.

In this way, each of the areas R1 to R8 is erased in order by a predetermined pixel unit (80 dots) as shown in FIGS. 5E, 5F, 5G, 5H, and 5I in accordance with the movement of the eraser bar 40 in the right direction. When the eraser bar 40 is moved to the position overlapping the area R10 shown in FIG. 3, the control unit 22 erases the areas R1 to R9 but does not erase the area R10 (80 dots) in the drawing screen 20 as shown in FIG. 5J. As described above, the erased picture is redisplayed when the eraser bar 40 is slid in the left direction since the picture in the areas R1 to R9 is stored in the memory 22a.

Then, when the eraser bar 40 is moved to the place overlapping the area R11 at the right end of the slide groove 41 and the eraser bar position detection port 42 is in a state P11, the control unit 22 erases the picture in all of the areas R1 to R10 on the drawing screen 20 as shown in FIG. 5K and also deletes the picture data stored in the memory 22a. Accordingly, when the eraser bar 40 is moved to the left end of the slide groove 41 (i.e. the place overlapping the area R1) to set the device to the drawing mode, a new picture can be drawn since the picture on the drawing screen 20 have already erased. The picture may be stored in the storage unit of the memory 22a by performing a predetermined storage operation before erasing the picture on the drawing screen 20 as described above, and then the picture may be erased from the drawing screen 20. The erased picture G may be listed at a later date and selected for redisplay by performing the redisplay operation. Then, a new picture may be added to the drawing screen while redisplaying the selected picture G.

(Operation of First Embodiment) Now, the operation of the first embodiment will be described. In the drawing mode where the eraser bar 40 is placed in the area R1 at the left end of the slide groove 41 (the drawing screen 20), the pressure sensor 21 detects the movement of the stylus 30 as pressure when the stylus 30 is moved on the drawing screen 20. Then, the control unit 22 performs the drawing process in which a line can be drawn along the trajectory of the positions where the pressure sensor 21 detects the pressure. At this time, it is possible to set the font of the line such as its type, size, and color based on the operation of the sensor group 50.

Therefore, it is possible to freely draw a variety of lines with various colors, types, and sizes compared to lines drawn by a conventionally known drawing magnet.

When the picture G on the drawing screen 20 is to be erased as shown in FIG. 5A, the eraser bar 40, which is located at the left end of the slide groove 41, is slid in the right direction similar to the erase operation of the conventional magnetic drawing device. Accordingly, as shown in FIG. 5B to FIG. 5J, the control unit 22 erases the picture (the picture G) on the drawing screen 20 by each of the areas R1 to R9 each having a width with a predetermined pixel unit in accordance with the position of the eraser bar 40. As shown in FIG. 5K, the picture G in all of the areas R1 to R10 of the drawing screen 20 is erased when the eraser bar 40 is slid to the right end of the slide groove 41.

As a result, the picture on the drawing screen 20 can be erased by sliding the eraser bar 40, which is a conventionally known motion, even with the drawing screen 20 consisting of the liquid crystal screen. Therefore, younger children can intuitively perform the erase operation even when it is first time for them to use the device. Further, in the states before the state P11 where the eraser bar 40 is slid to the right end of the slide groove 41, the erased picture can be redisplayed. Therefore, the drawing device of this embodiment has better usability than the conventional magnetic drawing device.

(Effect of First Embodiment) Hereinafter, effects of the drawing device according to the first embodiment will be described.

1) The drawing device according to the first embodiment includes the device body 10 that includes the drawing screen 20 of a liquid crystal screen, the pressure sensor 21 provided on the drawing screen 20 and configured to detect pressure applied to the drawing screen 20, the eraser bar 40 provided in the device body 10 and configured to slide along the drawing screen 20, the eraser bar position detection port 42 as an eraser bar position sensor configured to detect the position of the eraser bar 40, and the control unit 22 configured to perform a drawing process in which a picture is drawn on the drawing screen 20 along a position where the pressure on the drawing screen 20 is detected, wherein the control unit 22 is configured to erase the picture on the drawing screen 20 in accordance with a moving range of the eraser bar 40 when the eraser bar 40 is moved.

Accordingly, the picture on the drawing screen 20 can be erased only by sliding the eraser bar 40 along the drawing screen 20, which is a conventionally and commonly recognized simple operation. As described above, the picture can be erased by intuitively performing the erase operation based on the conventionally common recognition even with the drawing screen 20 of the liquid crystal module, and accordingly the drawing device has better usability.

2) The drawing device according to the first embodiment is characterized in that the control unit 22 is configured to set the drawing device to a drawing mode that allows drawing in all areas of the drawing screen 20 when the eraser bar 40 is placed at one end (left end) of the drawing screen 20, and to erase the picture G from the one end (left end) of the drawing screen 20 in accordance with the movement of the eraser bar 40 from the one end (left end). The eraser bar 40 can erase the picture G in all areas of the drawing screen 20 by only one slide from one end (left end) to the other end (right end). Accordingly, the drawing device has better operability than one which performs an operation as an eraser mode in which the picture is traced and erased.

3) The drawing device according to the first embodiment is characterized in that the eraser bar position detection port 42 as the eraser bar position sensor is configured to detect an area corresponding to a predetermined pixel unit (80 dots), and the control unit 22 is configured to erase the picture G in an area along which the eraser bar 40 passes in accordance with a position of the eraser bar 40. The picture G can be erased by a predetermined pixel unit when the eraser bar 40 passes. Accordingly, it is possible to simplify the detection of the positions of the eraser bar 40 and the control of the erase operation compared to one which gradually erases the picture in accordance with the movement of the eraser bar 40. As a result, the configuration can be simplified and cost can be reduced.

4) The drawing device according to the first embodiment is characterized in that the control unit 22 includes a memory 22a which stores the picture G displayed on the drawing screen 20, and the erased picture G is redisplayed by the movement of the eraser bar 40 in a direction opposite to a direction to erase the picture before moving the eraser bar 40 to the area R11, which is an operation to erase the picture G in all of the areas. As opposed to the conventional magnetic drawing device, it is possible to stop erasing the picture to redisplay the erased parts of the picture G and accordingly the drawing device has better usability. Further, after completely erasing the picture, a new picture can be drawn on the drawing screen 20 by not redisplaying the picture, which can be done by an operation based on the movement of the eraser bar 40. Therefore, the drawing device has better usability than one having additional buttons such as an erase-all button and the like. 5) The drawing device according to the first embodiment is characterized in that the eraser bar position detection port 42 includes a plurality of ports (the input ports 1 to 6) which are connectable to terminals of the eraser bar 40, and the port terminal portion 4a to 4f of each of the input ports 1 to 6 is arranged so that a contact state (P1 to P11) differs for each of the areas R1 to R11 in the drawing screen 20. Accordingly, the position can be detected with high accuracy by a simple configuration. As a result, the configuration can be simplified and cost can be reduced.

The embodiment of the present disclosure is described in detail with reference to the drawings. However, specific configurations are not limited to the above embodiment or examples, and the modifications of the design that do not deviate from the gist of the present disclosure are included in this disclosure.

For example, the shapes of the device body and the drawing screen are not limited to ones shown in this embodiment. The aspect ratio of the drawing screen, the number of pixels thereof, and the like may be appropriately set. Further, the eraser bar position sensor is not limited to a configuration shown in the embodiment which detects based on the length of the terminals of the input ports. Other means may be used as long as the position of the eraser bar can be detected. For example, means in which the erasing bar moves along a resistor arranged along the drawing screen and the position is detected based on the change in the resistance value of the resistor. Moreover, in this embodiment, the stylus is used to draw lines or pictures but the present invention is not limited to use of the stylus. Pictures may be drawn by pressurizing the drawing screen with things other than the stylus such as a finger. In addition, in this embodiment, the eraser bar is disposed on the front side of the drawing screen but the present invention is not limited to this position. The eraser bar may be disposed to slide along the left side or the right side of the drawing screen.

What is claimed is:

1. A drawing device comprising:
a device body that comprises a drawing screen of a liquid crystal screen,
a pressure sensor provided on the drawing screen and configured to detect pressure applied to the drawing screen,
an eraser bar provided in the device body and configured to slide along the drawing screen,
an eraser bar position sensor configured to detect a position of the eraser bar, and
a controller configured to perform a drawing process in which a picture is drawn on the drawing screen along a position where the pressure on the drawing screen is detected,
wherein the controller is configured to set the drawing device to a drawing mode that allows drawing in all of areas of the drawing screen when the eraser bar is placed at one end of the drawing screen, and
to erase the picture on the drawing screen from the one end of the drawing screen in accordance with a movement of the eraser bar from the one end to another end of the drawing screen based on a moving range of the eraser bar, and
wherein the controller comprises a memory that stores the picture on the drawing screen, and
wherein the erased picture is redisplayed by a movement of the eraser bar in a direction opposite to a direction to erase the picture before performing an operation to erase the picture in all of the areas; and
wherein the eraser bar position sensor is configured to detect an area corresponding to a predetermined pixel unit, and
wherein the controller is configured to erase the picture in an area along which the eraser bar passes in accordance with a position of the eraser bar; and
wherein the eraser bar position sensor comprises a plurality of ports provided on the device body and at least one terminal provided on the eraser bar, and wherein each of the ports includes a terminal portion which is arranged and configured to contact the terminal provided on the eraser bar when the eraser bar is positioned thereover so that a different contact state is defined for each of the areas.

2. The drawing device according to claim 1, wherein the controller is configured to completely erase the picture when the eraser bar is slid to the other end of the drawing screen and not to redisplay the erased picture.

3. The drawing device according to claim 1, wherein the memory is configured to store picture data when a storage operation is performed, and
wherein the controller is configured to completely erase the picture when the eraser bar is slid to the other end of the drawing screen and to redisplay the erased picture from the data stored in the memory when a redisplay operation is performed.

4. A drawing device comprising:
a device body that comprises a drawing screen of a liquid crystal screen,
a pressure sensor provided on the drawing screen and configured to detect pressure applied to the drawing screen,
an eraser bar provided in the device body and configured to slide along the drawing screen,
an eraser bar position sensor configured to detect a position of the eraser bar, and
a controller configured to perform a drawing process in which a picture is drawn on the drawing screen along a position where the pressure on the drawing screen is detected,
wherein the eraser bar position sensor is configured to detect a generally rectangular area extending the height of said screen and corresponding to a predetermined pixel unit in a width direction, and
wherein the controller is configured to erase the picture in an area along which the eraser bar passes in accordance with a position of the eraser bar; and
wherein the eraser bar position sensor comprises a plurality of ports provided on the device body and at least one terminal provided on the eraser bar, and wherein each of the ports includes a terminal portion which is arranged and configured to contact the terminal provided on the eraser bar when the eraser bar is positioned thereover so that a different contact state is defined for each of the areas.

* * * * *